United States Patent Office 3,716,509
Patented Feb. 13, 1973

3,716,509
METHOD FOR AGGLOMERATING AND STABILIZING RUBBERY POLYMER LATICES
Alva F. Harris, Wilbraham, Mass., assignor to Monsanto Company, St. Louis, Mo.
No Drawing. Continuation-in-part of abandoned application Ser. No. 84,137, Oct. 26, 1970. This application Jan. 12, 1972, Ser. No. 217,267
Int. Cl. C08f 47/02
U.S. Cl. 260—23.7 A                                    19 Claims

ABSTRACT OF THE DISCLOSURE

There is disclosed a process for agglomerating latices of a rubbery polymer to provide larger particles. Contact is effected between a cationic exchange resin and an aqueous latex of a polymer which contains an organic acid salt emulsifying agent for the latex and sulfate and/or phosphate radicals chemically bonded to the polymer particles. The admixture is maintained in contact for a period sufficient to remove a substantial amount of the emulsifying agent cation to produce agglomeration of the particles, which are cohesive under the conditions of operation. Thereafter, the latex and exchange resin are separated and the latex is stabilized, such as by addition of a reagent furnishing a cation capable of regenerating the emulsifying agent. The process produces agglomeration with a minimum amount of coagulation, and it is especially well suited to use on a continuous basis.

CROSS-REFERENCE TO RELATED APPLICATION

The present application is a continuation-in-part of my copending application Ser. No. 84,137, filed Oct. 26, 1970 now abandoned.

BACKGROUND OF THE INVENTION

Latices of various polymers are useful for a wide range of applications. In recent years, rubber latices have been widely employed for the manufacture of rubber-reinforced plastics such as impact styrene and ABS materials. Although rubbers may be mechanically admixed with such polymers, greatly improved results are obtained by providing chemical adhesion between the rubber phase and the matrix by grafting at least a portion of the matrix polymer onto the rubber particles. It has also been noted that, within certain limits, the impact strength of the rubber-modified compositions at times is dependent upon the size of the rubber particles dispersed therein, as a result of which there has been interest in increasing the size of the rubber particles obtained from conventional latex polymerization processes.

Various techniques have been suggested for increasing the size of the rubber particles in the latex, including seeding during polymerization and agglomeration by freeze-thaw, acidulation and salting techniques. Many of the procedures suggested have not offered large enough particles within reasonably controlled spreads of particle size, or have involved critical control of the various aspects of the process, or have been relatively costly. In some instances, the chemical nature of the agglomerated rubber particle has varied from that of the particles prior to agglomeration.

Highly effective techniques for obtaining agglomerated latex particles have been disclosed by William O. Dalton in copending applications entitled Method for Agglomerating Latices with an Anhydride (Ser. No. 677,078, filed Oct. 23, 1967) and Method of Agglomerating Latices (Ser. No. 694,870, filed Jan. 2, 1968), now United States Letters Patent Nos. 3,558,541 and 3,551,370, respectively, whereby acid anhydrides are used to destroy the emulsifying agent and thereby permit the polymer particles to agglomerate upon collision. However, there remains a desire for processes that are especially well suited for use on a continuous or semi-continuous basis and which are relatively inexpensive.

Accordingly, it is an object of the present invention to provide a novel process for agglomerating relatively small rubbery particles in an aqeous latex into larger particles, which process affords relatively good control over the range of particles produced and improved economy and cycle times.

It is also an object to provide such a process which may be used with latices of various polymers having a composition providing a surface permitting fusion or bonding of colliding particles.

Another object is to provide such a process which is particularly advantageous for producing large rubber particles useful as a reinforcing agent in various polymeric matrices.

Still another object is to provide a process that is especially well suited for use on a continuous or semi-continuous basis.

SUMMARY OF THE INVENTION

It has now been found that the foregoing and related objects of the present invention can be readily attained in a method of agglomerating soap-stabilized rubber latices, wherein intimate contact is effected between a water-insoluble cationic exchange resin and a rubber latex containing about 0.3 to 10.0 weight percent of fatty acid salt emulsifying agent, based upon the weight of rubber therein. The rubber latex has a solids content below about 50.0 weight percent and a number average particle size of less than about 0.15 micron. The particles are cohesive under the conditions of operation, and have chemically bonded to them at least about 0.02 percent, based upon the weight of the particles, of a charged radical selected from the group consisting of sulfate, sulfonate, phosphate, phosphonate, and mixtures thereof. The exchange resin is used in an amount and for a period of time sufficient to remove a substantial portion of the rubber particles to a number average particle size of about 0.1–0.7 micron. Thereafter, separation of the exchange resin and the latex is effected, and at least one reagent capable of stabilizing the rubber particles in the latex and of preventing substantial coagulation thereof is added thereto.

Preferably, the added reagent furnishes a cation capable of reacting with the fatty acid anion of the emulsifying agent to regenerate at least a portion thereof, in which case the reagent is added to the latex subsequent to separation of the resin. The added reagent may be an acid-type surface active agent which is added to the latex prior to separation; as another alternative, a relatively minor amount of such an agent may be added prior to separation of the resin, with the cation-furnishing reagent being added after that step.

The rubber used preferably has a rubber-forming diene monomer content of at least about 50.0 percent by weight. Most desirably, the rubber will have a diene content of at least about 75.0 weight percent, with the rubber being selected from the group consisting of homopolymers and copolymers of conjugated 1,3-dienes having a second order transition temperature not higher than about 0° centigrade. Preferably, the latex will have a solids content of less than about 35.0 percent by weight.

The emulsifying agent is preferably selected from the class consisting of alkali metal and ammonium salts of aliphatic carboxylic acids containing 12 to 22 carbon atoms in the aliphatic chain. More specifically, the aliphatic acid is desirably selected from the group consisting of oleic, stearic, palmitic, and mixtures thereof. The cation exchange resin may comprise a polymeric matrix having strong acid functional groups, such as a sulfuric acid functionality, substituted along the polymer chains. The latex will desirably contain the residue of the polymerization initiator for the rubber, which will provide the bonded radical on the particles thereof, and most preferably the radical will be present in an amount of about 0.050 to 0.20 percent by weight of the rubber.

The required intimate contact between the latex and cation exchange resin may be effected simply by admixing the resin with the latex in an amount sufficient to provide an excess of resin, based upon the molar equivalent of emulsifying agent cation. In such case, separation is conveniently effected by decantation of the latex from the resin. Alternatively, after contact has been effected an emulsifying agent, as previously described, may be added; thereafter, separation may be readily carried out by filtration of the admixture.

In the particularly preferred embodiments of the invention, the required contact between latex and the cation exchange resin is effected by passing the latex through a bed of the resin. This is most desirably done on a continuous basis by passing an initial portion of a stream of the latex through a first bed of the resin until prior to exhaustion of the resin therein. Thereafter, flow of the stream to the first bed is terminated, and the succeeding portion of the latex stream is passed through a second bed of resin until prior to exhaustion thereof. The resin of the first bed is regenerated preferably during passage of the succeeding portion of the stream through the second bed, and thereafter a further portion of the latex stream is passed through the first bed of resin. In the contact step, a water-insoluble anionic exchange resin may be used in addition to the cationic resin.

As will be fully pointed out hereinafter, the present process may be used with various latices of polymers which have surfaces that are relatively soft and cohesive under the conditions of operation, and which utilize as emulsifying agents salts of fatty acids. It appears that the mechanism of the process involves the removal of a portion of the cationic moiety of the emulsifying agent to reduce or destroy the ability of the emulsifying agent to stabilize the latex particles. As a result, it is believed that Brownian movement may cause direct collisions to occur among the rubber particles, which cohere to form agglomerates. Apparently, by controlling collisions and growth coagulation is avoided to produce particles of the desired size, and it is believed that the chemically bound radical on the rubber particles plays a significant role in this respect.

DESCRIPTION OF THE PREFERRED EMBODIMENTS

As will be readily appreciated, various factors affect optimum operation of the process and the several variables must be considered in determining the process conditions required for a given latex and/or a given particle size increase. The effect of such variables will be discussed at length hereinafter and illustrated in the examples.

The polymeric latex

The latices which may be used in the present invention are those of rubber particles that are inherently sufficiently soft or tacky under the conditions of operation so that the particles cohere upon collision once the protection of the emulsifying agent is removed or impaired. Thus, the polymers with which the present invention may be employed are the rubbery polymers such as the diene rubbers, acrylate rubbers, ethylene-propylene rubbers and mixtures thereof. Generally, the saturated acrylate and ethylene-propylene rubbers desirably contain small amounts of a poly-unsaturated monomer such as a diene where such rubbers are to be used as a substrate for grafting.

The preferred latices are those of diene rubbers or mixtures of diene rubbers, i.e., any rubbery polymers (a polymer having a second order transition temperature not higher than 0° centigrade, preferably not higher than —20° centigrade, as determined by ASTM Test D-746-52T) of one or more conjugated 1,3-dienes, e.g., butadiene, isoprene, piperylene, chloroprene, etc. Such rubbers include homopolymers of conjugated 1,3-dienes and copolymers with up to an equal amount by weight of one or more copolymerizable monoethylenically unsaturated monomers, such as monovinylidene aromatic hydrocarbons (e.g., styrene; an aralkyl-styrene, such as the o-, m-, and p-methylstyrenes, 2,4-dimethytl-styrene, the arethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropropenyl ketone, etc.) alpha-olefins (e.g., ethylene, propylene, etc.); pyridines; vinyl esters (e.g., vinyl acetate, vinyl stearate, etc.), vinyl acids (e.g., vinyl sulfonic acid, vinyl phosphonic acid), vinyl and vinylidene halides (e.g., the vinyl and vinylidene chlorides and vinylidene chlorides and bromides, etc.); and the like.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or interpolymers of 90.0 to 95.0 percent by weight butadiene and 5.0 to 10.0 percent by weight of acrylonitrile or styrene. As the content of a non-rubbery monomer in a rubber copolymer approaches 50 percent by weight of the interpolymer, there is a tendency to form coagulum so that the preferred rubbery interpolymers will normally contain less than about 35.0 percent of a non-rubbery monomer, particularly when such a monomer is polar.

Although the rubbery polymer may contain minor amounts of a cross-linking agent, generally less than about 2.0 percent by weight, excessive cross-linking of the polymer should be avoided since it renders the surface of the particles relatively hard and the particles do not adhere to each other upon collision. Subsequent to agglomeration in accordance with the present invention, the particles may be highly cross-linked if so desired with possible benefits in agglomerated particle stability, although high cross-linking may be undesirable for some process to which the rubber may later be subjected and wherein solution or optimum dispersion of the rubber is desired.

The solids content of the latices may vary from as little as about 5.0 percent to as much as about 50.0 percent by weight. However, as a practical matter, the latices suitable for use herein will not generally contain more than about 40.0 weight percent of solids, and preferably the concentration will be less than about 35.0 percent. The very dilute latices are less conductive to formation of optimum particle size within reasonable time periods and the more concentrated latices tend to require more critical process control, especially with respect to the maximum amount of emulsifier that can be used while preserving the ability to obtain satisfactory agglomerates. Generally, the particle size of the agglomerate increases with increasing solids content in the latex.

The latex must contain an emulsifying agent which is the salt of a fatty acid such as, for example, the conventionally employed fatty acid soaps, exemplary of which are sodium oleate, sodium stearate, sodium palmitate, the equivalent potassium salts, and mixtures thereof such as rubber reserve soap. Generally, such fatty acid soaps may be characterized as the alkali metal salts of the $C_{12}$–$C_{22}$ aliphatic acids, although ammonium salts may be useful in some applications. In addition, the latex may contain other emulsifying agents such as the anionics or non-ionics so long as these other emulsifying agents are not present in such a concentration as to render the latex unduly stable to the ion exchange treatment.

As will be appreciated, the amount of emulsifying agent employed will vary with the concentration of the latex and the particular polymer involved, but it will generally be about 0.3 to 10.0 percent, based upon the weight of rubber in the latex; preferably the amount of emulsifier used will be about 0.5 to 5.0 percent. Since the presence of more emulsifying agent than that which is necessary for adequate stability of the latex is usually undesirable, due to the decrease in efficiency as well as the increased load upon the cation exchange resin, the concentration thereof will not often exceed 2.0 percent.

Polymerization initiators

Although the rubbers of the latices herein described may be prepared using any of the free-radical initiators conventionally employed for that purpose, or by thermal or high energy activation, particularly desirable results are achieved when the rubber has been prepared with a persulfate or perphosphate initiator, or with a redox system employing such a compound. Generally, the initiators of this sort will be employed as the alkali metal (e.g., sodium or potassium) or ammonium salts, and typical redox systems include, along with the persulfate or perphosphate, a reducing component; for example, sodium bisulfite, sodium thiosulfate, sodium formaldehyde sulfoxalate, metal ions such as iron and copper, etc. are typically used. Mercaptans, such as the tertiary and normal dodecyl compounds employed in the examples hereof, also seem to function with the potassium persulfate used therein as a redox couple. The persulfate or perphosphate compound will be used in a catalytically effective amount, which will generally be about 0.05 to 1.0 part based upon 100 parts of polymerizable monomer present in the reaction mixture, and optimum results in the polymerization reaction will usually be achieved with about 0.1 to 0.3 part per hundred of the initiator compound. Apparently, sulfate ($SO_4^{-1}$) and/or phosphate ($PO_4^{-2}$) radicals become end groups on a majority of the rubber molecules during polymerization, and thereby furnish the chemically bonded charged radicals which are believed to be effective in the agglomeration reaction.

Although the amount of the charged radical which is present in the rubber will depend upon the molecular weight of the latter, generally it will be present in an amount of at least about 0.02 percent based upon the weight of rubber. Preferably, the weight of the charged radical will be about 0.05 to 0.2 percent, and usually the amount thereof will be about 0.075 to 0.125 percent, on the indicated basis.

Inorganic electrolytes

Although not absolutely essential, it is preferred to include within the latex a small quantity of inorganic electrolyte to maintain viscosity at a desirably low level, particularly when the solids content of the latex is about 35.0 percent or higher. Various water-soluble monovalent and polyvalent metal and ammonium salts may be used as the electrolyte including halides, sulfates, nitrates and phosphates depending upon the latex and the presence of radicals therein which might be detrimental in combination therewith. Exemplary of the salts which may be employed are sodium chloride, potassium chloride, sodium sulfate, ammonium chloride, ammonium sulfate, etc. From the standpoint of minimizing contamination the preferred electrolytes are the salts of the alkali metals and ammonia. The alkali metal and ammonium halides and sulfates have proven highly advantageous from the standpoint of control, cost and minimal adverse effect upon the latices.

The amount of the inorganic electrolyte will vary with the particular latex, the solids content thereof, and the particle size that is desired. Generally, beneficial results are obtained with as little as 0.05 part of the electrolyte per 100 parts of the rubber of the latex, but preferably the amount of the electrolyte is at least 0.2 part per hundred. Generally, electrolytes such as sodium and potassium chloride will be present in a maximum concentration of about 1.0 percent, since greater amounts tend to induce coagulation. However, other compounds might be used in higher concentrations, but usually with little or no added benefit. Although addition of electrolyte may occur during polymerization, it is much more desirably introduced before any monomer is added to ensure homogeneous distribution and to avoid localized concentrations which would ultimately tend to cause coagulation.

The cation exchange resin

Virtually any water-insoluble cation exchange resin capable of effecting the removal of the emulsifying agent cation and reasonably readily separable from the latex may be employed in the practice of the instant method. The strong acid types, such as those having nuclear sulfonic and methylene sulfonic functionalities, are preferred, but the intermediate acid (phosphonic acid, phosphonous acid, phosphoric acid) types might also be feasible. Quite commonly, the acid functionality is substituted in a polymer of an aromatic monomer, e.g. a phenolic condensation product or a divinyl benzene cross-linked polystyrene-type resin. Cationic exchange resins of the types mentioned herein are commercially available, under the trademark Duolite, from Diamond Shamrock Co. of Cleveland, Ohio and, under the trademark Dowex, from the Dow Chemical Co. of Midland, Mich.

The amount of the cation exchange resin employed will depend upon a number of factors: the particular resin involved, the concentration of emulsifier in the latex, the residence time of contact, the manner of treatment, etc. However, most desirable results will usually be realized when the resin is present in an excess amount; i.e., a quantity of resin greater than that theoretically necessary to exchange the cation of all of the fatty acid soap contacted therewith. However, lesser amounts of the ion exchange resin may be desirable for some purposes.

As will be appreciated, the commercial cation exchange resins are most often sold in the salt (usually sodium) form, and therefore must be activated prior to use. This is conventionally accomplished simply by treatment with hydrochloric acid to convert the resin to the acid form. Similarly, after use the cation exchanged may be removed from the resin by such acid treatment, thereby regenerating the resin for subsequent use. It should also be appreciated that other materials may be mixed with the cation exchange resin, such as an anion exchange resin primarily for the purpose of removing additional ions from the latex which may be disadvantageous or detrimental in some respect. Of course, a subsequent anion exchange treatment may also be employed.

The agglomerating reaction

As previously indicated, the exchange resin must be reasonably homogeneously distributed throughout the latex to achieve proper results; however, undue agitation after introduction of the latex to the resin, or vice versa, should be avoided. Although it has been found that some stirring at very slow rates and with very low power or shear input can be tolerated, difficulties in avoiding zones of higher agitation favor the complete elimination of agitation when possible. Be that as it may, if the treatment vessel is jacketed for temperature control some stirring may be desirable to obtain satisfactory heat transfer, but it generally should be minimized as much as possible to achieve optimum results. As used herein, the term "minimal agitation" refers to the absence of agitation or the use of relatively minimal agitation at a level below which coagulation will occur.

The time required for the agglomeration of the latex particles to the desired size will be dependent upon a number of factors, including temperature, the relative amounts of cation exchange resin and emulsifying agent, the nature of the latex polymer, the initial and desired sizes of the latex particles, the manner of treatment, etc. In practice, it has been found that beneficial results may be obtained with residence times as brief as one minute, and although often affording no significant added benefit, treatment for as long as 24 hours or more is found to produce no undesirable effect.

In the temperature range of ambient to about 90° centigrade, time periods of about one to 15 minutes will normally produce optimum results, and the reaction is most conveniently conducted at ambient temperatures over a period of about 5 to 10 minutes. The time required for equivalent results is normally extended by a lowering of the temperature since agitation of the particles due to Brownian movement is decreased thereby. However, the reaction can be performed satisfactorily at any temperature above the freezing point of the latex in most instances, and temperatures as low as 0° centigrade may sometimes be feasible. Size of the agglomerates has not been found to depend appreciably upon the temperature used.

As has been pointed out hereinbefore, batchwise contact may be effected by adding the latex to the resin or the resin to the latex in a suitable vessel and simply allowing the admixture to remain in contact for an appropriate time period ,either quiescent or with a suitable level of agitation. Thereafter, separation may be effected in any feasible manner, such as by decantation of the latex from the resin (after permitting the resin to settle out of the latex) or by filtration. Although the latter technique may be more efficient, the danger of causing coagulation of the particles is also greater; as a result, it is advisable to employ a relatively large mesh filter material. Preferably, in such a case, the agglomerated latex is stabilized prior to separation of the resin as will be described more fully, hereinafter.

An especially significant benefit afforded by the present method is its ready adaptability to continuous operation. Among the very appreciable advantages occasioned by use of such a technique are minimization of manipulative steps, separation of the latex concurrently with treatment, increased capacity, economy, etc. Although the actual equipment and procedure may be somewhat more elaborate than indicated hereafter, continuous operation may be conveniently carried out by use of two or more beds of exchange resin in separate columns, through which a latex stream may alternately be passed and having means for interim regeneration of the resin therein. With such an arrangement, the stream may first be passed into one of the columns until such time as the resin therein begins to lose effectiveness (or preferably on a predetermined schedule), after which the stream may be diverted (such as through a simple three-way valve) to a second column containing a fresh bed of resin. While the latex stream is being treated in the second column, the resin in the first column may be regenerated by introduction and passage therethrough of hydrochloric acid or the like, and a suitable valved conduit may be attached to the column for that purpose. After an appropriate interval, the latex stream may be diverted back to the first column, at which time regenerative treatment may be commenced in the second column. It will be appreciated that additional columns may be provided in the system to permit down time of one or more columns or extended resin treatment periods. With suitable monitoring and controlling apparatus, the agglomeration process may be effected on a substantially continuous and automatic basis, if so desired.

The particle size of the agglomerate can be varied by selecting the conditions of the agglomerating reaction such as time, temperature, exchange resin, emulsifying agent, and ratio of resin thereto. In addition, the particle size will tend to increase with increase in the solids content of the latex. With the present invention, it is possible to obtain an increase in particle size from original latex particles of less than about 0.15 micron (number average) to agglomerated particles of about 0.1–0.7 micron; in some cases, latices having particles of 0.8–1.0 micron and even larger may be obtained.

Stabilization of the agglomerated latex

After the agglomerating reaction has proceeded to the desired extent, the latex must be stabilized before it is subjected to any great measure of agitation or otherwise induced shear force, to avoid formation of coagulum. This preferably is achieved by adding a reagent furnishing a cation capable of reacting with the fatty acid anion to regenerate the soap, and the cation may either be the same as that originally present in the soap, or it may be different if so desired. However, such regeneration is not a feasible means of stabilization when the cation exchange resin is still present; accordingly stabilization under such conditions (as may be desirable prior to filtration to remove the resin) is conveniently effected by introduction of a suitable acid type surface active agent (such as the sodium lauryl alcohol sulfate wetting agent sold by E. I. du Pont de Nemours & Co. under the trademark Duponol ME, Dowfax 2A1 sold by The Dow Chemical Company, etc.). A fairly large amount (e.g., about 0.5–3.0 percent) of such an agent may be used to achieve an adequately stabilized final product, but it may be preferred to use about 1.0 percent or less thereof with ultimate stabilization being achieved by regeneration of the fatty acid soap, as previously described; this minimizes both the cost and also the amount of foreign, and possibly interfering or undesirable, substances that are introduced into the product. After stabilization, the latex may be agitated or otherwise handled as required for subsequent processing and further reactions, such as grafting and the like.

As the added reagent for regeneration, ammonia, alkali metal hydroxides, or other basic compounds such as carbonates are conveniently employed, and mixtures thereof may be most desirable. The amount added is preferably at least the stoichiometric equivalent required to react with the fatty acid moiety present, although somewhat smaller amounts may be used with some reduction in stability of the latex. Amounts of more than two times the stoichiometric equivalent may have an adverse effect upon some latices; as a result, the preferred amounts are 0.7–1.0 times the stoichiometric equivalent. The amount of any other stabilizer used will depend primarily upon its own characteristics, and so is best determined independently, in each instance. It will be understood that the agglomeration technique described herein need not be the only method used, and that other techniques, such as those of the William O. Dalton patents hereinbefore referred to, may be used in conjunction therewith.

Illustrative of the efficacy of the present invention are the following specific examples, wherein all parts and percentages are on a weight basis unless indicated otherwise.

EXAMPLE 1

About 2.0 parts by weight of either of two sulfonated divinylbenzene crosslinked polystyrene cation exchange resins sold by The Dow Chemical Company under the designations Dowex 50WX4 and 50WX10 is added to each of several vessels. The vessels contain about 50.0 parts by weight of one of several different soap-stabilized aqueous latices of a 90/10 butadiene/styrene copolymer rubber. The admixture is gently agitated and left in contact at room temperature for a period of about 5.0 to 10 minutes, after which the latices are filtered to remove the resin beads therefrom. Thereafter, the pH of each latex is adjusted with ammonia from the value of 2.0–2.5 prevailing therein to 9.0–9.5, whereby the latex is stabilized by regeneration of the soap.

The results that are achieved in the several runs (A–N) are reported in Table 1. The rubber latices treated differ in the content and type(s) of chain transfer agent [i.e., terpinolene, tert-dodecyl mercaptan (TDM), and normal dodecyl mercaptan (NDM)], in solids content, in initial weight average particle size [as determined by conventional turbidity techniques], and in the quantity of emulsifying agent [a rubber reserve soap of sodium salts of mixed fatty acids (RRS)], initiator [potassium persulfate] and electrolyte [potassium chloride]. The percentages set forth are based upon the weight of rubber in the latex. The final number average particle size in the agglomerated resin is determined in most instances by electron microscopy (in other cases marked with an asterisk, turbidity measurements are used to determine the weight average value), and the presence of the plus (+) sign after several of the values reported in the table indicates that the size of the particles is somewhat in excess of that reported. In no instance is the amount of coagulation or viscosity increase significant.

having a composition providing a surface permitting fusion or bonding of colliding particles, and the process affords relatively good control over the range of particles produced and improved economy and cycle times. The resultant agglomerated particles are stable under normal conditions of handling and processing and may be subjected to additional procedures, such as graft polymerization and the like. By reason of the simplicity of the operation, the present technique may be adapted readily to existing equipment and it is especially well suited for use on a continuous or semicontinuous basis.

What is claimed is:

1. In a method of agglomerating soap-stabilized rubber latices, the steps comprising:
   (A) effecting intimate contact between
       (1) a synthetic rubber latex having a solids content below about 50.0 weight percent and containing about 0.3 to 10.0 percent, based upon the weight of rubber in said latex, of a fatty acid salt emulsifying agent, said rubber having a number average particle size of less than about 0.15 micron and the particles thereof being cohesive under the conditions of operation and having chemical-

TABLE 1

| Run designation | A | B | C | D | E | F | G | H | I | J | K | L | M | N |
|---|---|---|---|---|---|---|---|---|---|---|---|---|---|---|
| Percent terpinolene | 0.25 | 0.25 | 0.25 | 0.05 | 0.50 | 0.50 | | 0.25 | 0.50 | | | | | |
| Percent TDM | 0.4 | 0.4 | 0.4 | 0.4 | 0.4 | 0.4 | | | | | | | | |
| Percent NDM | | | | | | | 0.4 | 0.4 | 0.4 | 0.4 | 0.4 | 0.4 | 0.4 | 0.4 |
| Percent RSS | 6.0 | 6.0 | 6.0 | 6.0 | 6.0 | 6.0 | 3.0 | 3.0 | 3.0 | 1.0 | 1.0 | 1.0 | 1.0 | 3.0 |
| Percent $K_2S_2O_8$ | 0.3 | 0.3 | 0.3 | 0.3 | 0 3 | 0.3 | 0.3 | 0.3 | 0.1 | 0.1 | 0.1 | 0.3 | 0.3 | 0.3 |
| Percent KCl | 0.5 | 0.5 | 0.5 | 0.5 | 0.5 | 0.5 | 0.5 | 0.5 | 0.5 | | | 0.5 | 0.5 | |
| Percent latex solids | 31.5 | 31.5 | 31.5 | 29.4 | 29.4 | 29.4 | 29.6 | 27.8 | 27.0 | 31.3 | 31.3 | 29.2 | 29.2 | 12.5 |
| Exchange resin | 10 | 4 | 10 | 10 | 4 | 10 | 10 | 10 | 10 | 10 | 4 | 10 | 4 | 10 |
| Initial particle size (micron) | 0.071 | 0.071 | 0.071 | 0.053 | 0.053 | 0.053 | 0.12 | 0.10 | 0.10 | 0.12 | 0.12 | 0.13 | 0.13 | 0.13 |
| Final particle size (micron) | 0.2 | *0.29 | 0.29 | 0.4 | *0.31 | 0.31 | 0.2 | 0.2 | 0.25 | 0.21 | *0.22 | *0.23 | *0.21 | 0.36 |

EXAMPLE 2

Part A

A quantity of the Dowex 50WX10 cationic exchange resin (acid form) referred to in Example 1 is mixed with an approximately equal amount of an anionic exchange resin (hydroxyl form) sold by The Dow Chemical Company under the designation Dowex 1X8, which is believed to be a styrene-divinylbenzene copolymer derivative. To about two parts of the mixture of exchange resins is added about 100.0 parts of a butadiene homopolymer latex having a solids concentration of about 30.0 percent and containing as the emulsifying agent about 0.3 part of the rubber reserve soap referred to in Example 1. In addition, the rubber latex contains about 0.12 part of tertiary dodecyl mercaptan, about 0.09 part of potassium chloride, and the residue from about 0.09 part of a potassium persulfate initiator.

The admixture is gently agitated and left in contact at room temperature for a period of about 5 to 10 minutes, after which the latex is filtered to remove the resin beads therefrom. Thereafter, the pH of the latex is adjusted with ammonia from the value of 2.0–2.5 prevailing therein to 9.0–9.5, whereby the latex is stabilized by regeneration of the soap. Prior to the agglomeration procedure, the particles of the latex are about 0.07 micron in maximum dimension (on a number average basis); thereafter, the number average particle size is about 0.3–0.4 micron. As in Example 1, no significant increase in viscosity or amount of coagulation is produced.

Part B

The procedure of Part A hereof is substantially repeated, with the sole execption that a 90/10 butadiene/styrene copolymer rubber is substituted for the butadiene homopolymer utilized therein. The results obtained are substantially the same.

Thus, it can be seen that the present invention provides a novel and highly effective process for increasing the size of the rubbery particles in aqueous latices by agglomeration thereof. It is used with latices of various polymers ly bonded thereto at least about 0.02 percent, based upon the weight thereof, of a charged radical selected from the group consisting of sulfate, sulfonate, phosphate, phosphonate, and mixtures thereof, and (2) a water-insoluble cationic exchange resin in an amount and for a period of time sufficient to remove a substantial portion of the cation of said emulsifying agent to effect agglomeration of said rubber particles to a number average particle size of about 0.1–0.7 micron;
   (B) effecting the separation and said exchange resin and said latex; and
   (C) adding to said latex at least one reagent capable of stabilizing the rubber particles therein and of preventing substantial coagulation thereof.

2. The method of claim 1 wherein said added reagent furnishes a cation capable of reacting with the fatty acid anion of said emulsifying agent to regenerate at least a portion thereof, and wherein said reagent is added to said latex subsequent to said step B.

3. The method of claim 1 wherein said added reagent is an acid-type surface-active agent which is added to said latex prior to said step B.

4. The method of claim 2 wherein a second reagent comprising a surface active agent stable in the presence of said cationic exchange resin is added in an amount of not more than 3.0 percent to said latex prior to said step B.

5. The method of claim 1 wherein said rubber has a rubber-forming diene monomer content of at least about 50.0 percent by weight.

6. The method of claim 5 wherein said diene content is at least about 75.0 percent by weight and wherein said rubber is selected from the group consisting of homopolymers and copolymers of conjugated 1,3-dienes having a second order transition temperature not higher than about 0° centigrade.

7. The method of claim 1 wherein said latex has a solids content of less than about 35.0 percent by weight.

8. The method of claim 1 wherein said emulsifying agent is selected from the class consisting of alkali metal and ammonium salts of aliphatic carboxylic acids containing 12 to 22 carbon atoms in the aliphatic chain.

9. The method of claim 8 wherein said aliphatic acid is selected from the group consisting of oleic, stearic, palmitic, and mixtures thereof.

10. The method of claim 1 wherein said cation exchange resin comprises a polymeric matrix, the polymer chains of which have strong acid functional groups substituted therealong.

11. The method of claim 1 wherein said particles of said latex have chemically bonded to them about 0.050 to 0.20 percent of said radical from said group, based upon the weight of said particles.

12. The method of claim 11 wherein said latex contains the residue of an initiator used for the polymerization of said rubber, said residue providing said radical from said group.

13. The method of claim 1 wherein said charged radical is sulfate.

14. The method of claim 1 wherein intimate contact between said latex and said cation exchange resin is effected by admixing said resin with said latex in an amount sufficient to provide an excess of said resin based upon the molar equivalent of said emulsifying agent cation, and wherein separation is effected by decantation of said latex from said resin.

15. The method of claim 3 wherein intimate contact between said latex and said cation exchange resin is effected by admixing said resin with said latex in an amount sufficient to provide an excess of said resin based upon the molar equivalent of said emulsifying agent cation, and wherein separation is effected by filtration of said admixture.

16. The method of claim 2 wherein intimate contact between said latex and said cation exchange resin is effected by passing said latex through a bed of said resin.

17. The method of claim 16 wherein said intimate contact is effected on a continuous basis by passing an initial portion of a stream of said latex through a first bed of said resin until prior to exhaustion of the resin in said first bed, thereafter terminating flow of said stream to said first bed and passing the succeeding portion of said latex stream through a second bed of said resin until prior to exhaustion of the resin therein, regenerating the resin of said first bed, and thereafter passing a further portion of said latex stream through said first bed of resin.

18. The method of claim 17 wherein the resin of said first bed is regenerated during at least a portion of the period of passage of said succeeding portion of said stream through said second bed, following which flow to said second bed is terminated and said further portion of said latex stream is passed through said first bed of resin.

19. The method of claim 1 wherein in said step A said rubber latex is also contacted with a water-insoluble anionic exchange resin.

References Cited
UNITED STATES PATENTS

| | | | |
|---|---|---|---|
| 3,048,556 | 8/1962 | Miller | 260—29.7 |
| 3,558,541 | 1/1971 | Dalton | 260—23.7 |
| 3,551,370 | 12/1970 | Dalton | 260—23.7 |

DONALD E. CZAJA, Primary Examiner

D. J. BARRACK, Assistant Examiner

U.S. Cl. X.R.

260—23.5 A, 29.7 PT